United States Patent [19]

Kattoh et al.

[11] 4,020,040
[45] Apr. 26, 1977

[54] COLORING COMPOSITIONS OF POWDER FORM

[75] Inventors: Tsutomu Kattoh, Suita; Junichi Kumabe, Kobe; Satoshi Hirabayashi, Nagaokakyo, all of Japan

[73] Assignee: Dainippon Ink and Chemicals, Incorporated, Tokyo, Japan

[22] Filed: Dec. 3, 1974

[21] Appl. No.: 529,084

[30] Foreign Application Priority Data

Dec. 4, 1973    Japan ............... 48-137122

[52] U.S. Cl. .............................. 260/42.56; 260/9; 260/17 R; 260/17.4 SG; 260/38; 260/828; 260/836; 260/847

[51] Int. Cl.$^2$ .......................................... C08J 3/22

[58] Field of Search ............ 260/42.56, 42.49, 828

[56] References Cited

UNITED STATES PATENTS

| | | | |
|---|---|---|---|
| 2,507,688 | 5/1950 | Armstrong | 260/42.49 |
| 3,111,495 | 11/1963 | Murphy et al. | 260/42.49 |
| 3,462,390 | 8/1969 | Dunn | 260/42.49 |
| 3,682,854 | 8/1972 | Bennahmias | 260/42.56 |
| 3,694,402 | 9/1972 | Essam | 260/40 R |
| 3,696,061 | 10/1972 | Selsor et al. | 260/2.5 M |
| 3,766,126 | 10/1973 | Siegle et al. | 260/37 N |
| 3,772,237 | 11/1973 | Bullman | 260/828 |
| 3,830,765 | 8/1974 | Fejer | 260/27 R |
| 3,899,473 | 8/1975 | Johansson | 260/42.49 |
| 3,907,727 | 9/1975 | Lipp | 260/17 R |

*Primary Examiner*—Edward M. Woodberry
*Attorney, Agent, or Firm*—Sherman & Shalloway

[57] ABSTRACT

A coloring composition of powder form comprising (a) a pigment, (b) a vinyl chloride copolymer of an average degree of polymerization of 100 – 2000 and in which the other monomer copolymerized with vinyl chloride is contained in a proportion of not more than 60 weight parts per 100 weight parts of vinyl chloride, and (c) a resin whose viscosity in a 40 weight % dimethylformamide solution is 80 – 7500 centipoises.

4 Claims, No Drawings

COLORING COMPOSITIONS OF POWDER FORM

This invention relates to a coloring composition of powder form excelling in dispersiveness in resin solutions. More particularly, the invention relates to a coloring composition of powder form excelling in dispersiveness in such coating materials as the polyurethane, vinyl, alkyd, phenolic, epoxy and butyral types of coating materials.

The pigment particles set up a firm secondary or tertiary aggregation during the steps of their manufacture, with the consequence that difficulty is experienced in dispersing the as-obtained particles. Hence, in the past, as colorants of coating materials there have been used those whose dispersiveness has been improved, such as (1) a coloring cmposition in which the pigment has been dispersed in a dispersing medium by mixing a pigment with either a plasticizer or a resin solution as the dispersing medium followed by breaking up the firm aggregations of the pigment particles in a roll or ball mill; or (2) a coloring composition prepared by adding either turpentine or benzine to a wet cake or aqueous paste of a pigment followed by flashing to obtain a flashed colorant which is then treated with either a surfactant or a dispersant.

As these colorants, those in either the paste or powder form are known. However, in the case of the colorants of paste form, since either a solvent or plasticizer is used, there were such problems as to whether or not the solvent would dissolve in the resin to be colored, the possibility of bleeding of the plasticizer, or the thickening and gelling of the paste. Again, its management was also inconvenient. Hence, in recent years there is an increasing demand for the colorants of powder form. However, in case of the conventional powder colorants, while it readily disperses in solvents, since the permeation of the solvent into the interior of the powder colorant was inadequate in a resin solution, difficulty was experienced in achieving complete dispersion. Hence, it was necessary to carry out a complicated treatment such as mixing the powder colorant and the resin solution for a prolonged period of time with a powerful agitator, or the resin solution had to be added after having first dispersed the powder colorant in a solvent.

The object of the present invention is to provide a powder colorant in which the pigment disperses homogeneously in a resin solution by stirring for a few minutes with either a spatula or a dispersing apparatus with the exertion of only a small amount of force.

The foregoing object can be readily achieved by combining (a) a pigment, (b) a vinyl chloride copolymer, (c) a resin whose viscosity in a dimethylformamide solution of 40 weight % concentration is 80–7500 centipoises and, as required, (d) a plasticizer.

According to our research, the mere fact that the surface treating agent or vehicle of a pigment excels in its miscibility with the resin to be colored and solubility in solvents does not means that the colorant will disperse readily, but it is believed that when, as the surface treating agent or vehicle, conjoint use is made of a resin whose viscosity differs greatly at the same concentration, the permeation into the interior of the powder colorant of the solvent proceeds readily even in a viscous resin solution to facilitate the dispersion of the colorant.

The pigments which come within the purview of the present invention are the pigments that are usually used for coating purposes and are imposed no special restrictions. Examples include the inorganic pigments such as carbon black, titanium dioxide, red oxide, cadmium yellow, cadmium red, chrome yellow and chrome orange, and the organic pigments such as the azo type pigments, quinacridone type pigments, phthalocyanine type pigments, perylene type pigments and dioxazine type pigments.

The vinyl chloride copolymer used in this invention is a copolymer of vinyl chloride with another monomer and is a known copolymer prepared by the suspension or solution polymerization process. The process for its preparation is disclosed in various publications including, for example, C. E, Schildknecht, Vinyl and Related Polymers, John Wiley & Sons, Inc., New York (1952) U.S. Pat. Nos. 1,935,577 and 2,075,429, Japanese Patent Publication 20301/68 and Belgian Pat. No. 726,842. As monomers copolyerizable with vinyl chloride, mention can be made of the vinyl esters such as vinyl acetate and vinyl stearate, the olefins such as ethylene and propylene, the vinyl ethers such as ethyl vinyl ether, and the acrylic acid esters such as acrylic acid esters and methacrylic acid esters and, in addition, such compounds as vinyl alcohol, maleic anhydride, maleic acid, itaconic acid, acrylonitrile and vinylidene chloride. The copolymer used in this invention is one of average degree of polymerization in the range 100–2000 and containing the monomer other than vinyl chloride copolymerizable therewith in a proportion of not more than 60 parts by weight per 100 parts by weight of the vinyl chloride, particularly preferred being that having a degree of polymerization in the range 350–800 and containing the monomer copolymerizable with the vinyl chloride in an amount of 5–30 parts by weight per 100 parts by weight of the vinyl chloride. A vinyl chloride copolymer of this kind not only dissolves readily in the coating material but can also impart to a film such inherent properties of vinyl chloride as flexibility, resistance to attack by chemicals, etc.

The resin to be used in combination with the aforementioned copolymer is one whose viscosity in a dimethylformamide solution of 40 weight % concentration (hereinafter referred to as 40% DMF viscosity) as measured with a BM Model rotation viscometer at 25° C. is 80–7500 centiposies. As specific examples of such resin, included are (1) the modified saccharoses obtained by etherifying or esterifying saccharose, e.g., sucrose-acetate isobutylate, sucrose-benzoate, sucrose-octapropyl ether, sucrose-octaacetate, and cyanoethyl sucrose; (2) the novolak type phenolic resins of molecular weight 200–1500, the soluble and fusible condensation products obtained by the reaction of a known penolic compound, e.g., phenol, cresol, xylenols, p-tert-butylphenol, catechol, resorcinol, pyrogallol, bisphenol A and salicylic acid with a known aldehyde, e.g.; formaldehyde, formalin, paraformaldehyde, hexamethylenetetramine, para-aldehyde and acetaldehyde; (3) ketonic resins of molecular weight 500–1000 obtained by the reaction of ketones, e.g., acetone, methyl ethyl ketone and cyclohexanone with the foregoing aldehydes; (4) the sulfonamide resins of molecular weight 500–1500 obtained by the reaction of toluenesulfonamide or chlorobenzenesulfonamide with the foregoing aldehydes; (5) the ether type epoxy resins, especially the epichlorohydrin-polyhydric phenol type epoxy resins of epoxy equivalent 170–3000 and the methylepichlorohydrin-polyhydric phenol type epoxy resins of epoxy equivalent 195–900, obtained by the reaction of an excess of a halogen-containing epoxide, e.g., epichlorohydrin and methylepichlorohydrin with a polyhydric phenol, e.g., bisphenol A, resorcinol, catechol, hydroquinone, methylresorcinol and 2,2-bis(4-hydroxyphenyl) butane; (6) the ester type epoxy resins of epoxy equivalent 170–210 obtained by the reaction of methylepichlorohydrin with a polycarboxylic acid, e.g., phthalic anhydride, hexahydrophthalic anhydride, trimellitic acid, adipic acid and dimeric acid; (7) the ether ester type epoxy resins of epoxy equivalent 500–900 obtained by the reaction of methylepichlorohydrin with the foregoing polyhydric phenols and the foregoing polycarboxylic acids; (8) nitrocellulose of RS -½ sec. - RS-4 sec.; and (9) the methyl methacrylatevinyl acetate copolymer of vinyl acetate content of 20–60% and an average degree of polymerization of 600–800.

While a resin whose 40% DMF viscosity is less than 80 centipoises can also be used in the present invention, the procurement of such a resin is difficult, because it is hardly ever used. Particularly preferred as resins to be used in the present invention of those mentioned above are the modified saccharoses, novolak type phenolic resins, ketonic resins, sulfonamide resins, methyl methacrylate-vinyl acetate copolymers, epichlorohydrin-bisphenol A type epoxy resins of epoxy equivalent 170–1500, methylepichlorohydrin-bisphenol A type epoxy resins of epoxy equivalent 195–900, methylepichlorohydrin-phthalic anhydride type epoxy resins of epoxy equivalent 170–180, methylepichlorohydrin-(bisphenol A + phthalic anhydride) type epoxy resins of epoxy equivalent 500–900 and nitrocellulose of RS-½ sec. - RS-2 sec. The 40% DMF viscosities of these resins fall in the range 80–3500 centipoises in all instances, and the invention coloring composition of powder form obtained by using these resins is characterized by the ready solution of its resinous portion and dispersion of its pigment in vehicles and, in addition, by the fact that streaks due to undissolved particles are not noted at all.

In the invention coloring composition of powder form the ratio in which the vinyl copolymer is mixed with the resin of 40% DMF viscosity of 80–7500is on a weight basis 1:0.1–20, preferably 1:0.5–10, and more preferably 1.0.5–5. When this range is deviated from, the colorant does not dissolve and disperse homogeneously.

On the other hand, the concentration in the composition of the pigment is from 20 to 80% by weight depending upon the purpose to which the composition is to be put, but in the case of an organic pigment 30–65% by weight is preferred, while in the case of an inorganic pigment 30–80% by weight is preferred.

So long as the invention coloring composition of powder form is one consisting of (a) a pigment, (b) a vinyl chloride copolymer and (c) a resin of 40% DMF viscosity of 80–7500 centipoises, an adequate improvement is had in the solubility and dispersiveness when the composition is added to a resin solution. However, when conjoint use is made of a plasticizer (d), such as that usually used with the vinyl chloride resins, the permeation of the solvent into the interior of the powder colorant is facilitated to a still greater degree.

Hence, such conjoint use is a highly desirable practice. However, when the plasticizer is added in too great an amount, it tends to bleed. Hence, the amount added of the plasticizer is preferably held to no more than 20% by weight of the total amount of the pigment (a), vinyl chloride copolymer (b) and resin (c). Usable plasticizers include the polycondensed type polyester plasticizers such as dibutyl phthalate, dioctyl phthalate, dibutyl sebacate, dioctyl sebacate, di-2-ethylhexyl azelate and dioctyl adipate; the polyhydric alcohol type polyester plasticizers such as dipentaerythritol hexaesters and epoxy oils; the phosphoric acid ester type plasticizers such as tricresyl phosphate and trioctyl phosphate; and the chlorine type plasticizers such as chlorinated paraffin and chlorinated polyethylene; especially preferred of these are the polycondensed type polyester type plasticizers and the chlorine type plasticizers.

The composition of this invention can also be incorporated with stabilizers and dispersants. As usable stabilizers, included are such, for example, as the known alkyltin maleate, alkyltin laurate and alkyltin mercaptan types of stabilizers, the Ca/Zn type composite stabilizer and the Ba/Cd/ (Zn) type composite stabilizer. Further, any of the surfactants such as the anionic, cationic and nonionic surfactants can also be used.

The invention coloring composition of powder form can be prepared by known methods. For example, employable is that consisting of mixing a pigment, a vinyl chloride copolymer and a resin whose viscosity in a 40% by weight of DMF solution is 80–7500 centipoises and, if necessary, a plasticizer and other additives, in a mixer, e.g., a kneader, a butterfly mixer or a gate mixer, along with an organic solvent, say, methyl ethyl ketone, methyl isobutyl ketone, ethyl acetate or butyl acetate, followed by kneading the mixture on a 2-roll or a 3-roll mill heated at 60°–90° C. and thereafter comminuting the kneaded mass to a particle size usually below 500 microns with a microcomminutor such as an atomizer or a Feather mill. Alternatively, there is that consisting of mixing a water-containing paste of a pigment in a mixer along with the resins and organic solvent followed by drying and comminuting the mixture.

EXAMPLE 1

Fifty grams of Chrome Phthal Red (a polyazo type red pigment), 20 grams of a vinyl chloride copolymer (vinyl acetate content 13%, average degree of polymerization 450, 40% DMF viscosity 14,000 cps.), 15 grams of nitrocellulose (RS -½ sec., 40% DMF viscosity 550 cps.), 10 grams of dibutyl phthalate, 5 grams of polyethylene glycol sorbitan monolaurate (dispersant), 0.5 gram of dibutyltin maleate (stabilizer) and 70 grams of methyl ethyl ketone were thoroughly mixed in a dispersing apparatus, following which the mixture was kneaded on a 2-roll mill and thereafter comminuted to a particle size of below 500 microns with a microcomminutor to obtain a powder colorant.

Two grams of the so obtained powder colorant was added to 20 of a 15% diethylformamide solution of polyvinyl butyral and stirred for 2 minutes with a spatule, whereupon the powder colorant was homogeneously dispersed in the resin solution.

When Cellophane was coated to a thickness of 3 mils with the so obtained colored resin solution and dried for 3 minutes with a 130° C. hot air drier, a transparent, glossy film was obtained.

Control 1

Fifty grams of Chrome Phthal Red, 45 grams of the vinyl chloride copolymer used in Example 1, 5 grams of polyethylene glycol sorbitan monolaurate, 0.5 gram of dibutyltin maleate and 70 grams of methyl ethyl ketone were throughly mixed in a dispersing apparatus, followed by kneading the mixture on a 2-roll mill and thereafter comminuting to a particle size below 500 microns to obtain a powder colorant.

This powder colorant was then added to a polyvinyl butyral solution identical to that of Example 1, stirred for 2 minutes and applied to a thickness of 3 mils to Cellophane as in Example I. An innumerable amount of colored particles of 50 microns or larger were noted in the so obtained film. This means that the resinous portion of the colorant is in an undissolved state and hence that the pigment is not homogeneously dispersed. This means of estimation will apply equally hereinafter.

Control 2

Fifty grams of Chrome Phthal Red, 35 grams of the nitrocellulose used in Example 1, 10 grams of dibutyl phthalate, 5 grams of polyethylene glycol sorbitan monolaurate, 0.5 gram of dibutyltin maleate and 70 grams of methyl ethyl ketone were thoroughly stirred in a dispersing apparatus, following which the mixture was kneaded on a 2-roll mill and thereafter comminuted to obtain a powder colorant.

The so obtained powder colorant was then added to a polyvinyl butyral solution and applied to a thickness of 3 mils to Cellophane as in Example 1. An innumerable amount of particles of the powder colorant of particle size greater than 50 microns were noted in the film.

EXAMPLE 2

Sixty grams of titanium dioxide, 17.5 grams of a vinyl chloride copolymer (vinyl acetate content 18%, average degree of polymerization 550, 40% DMF viscosity 13,000 cps.) and 17.5 grams of a cyclohexanone-formaldehyde condensation product (molecular weight 630, 40% DMF viscosity 200 cps.) were dissolved in 40 grams methyl ethyl ketone, following which the mixture was kneaded on a 70°–80° C. heated 3-roll mill and thereafter comminuted to obtain a powder colorant.

On the other hand, a prepolymer obtained from polytetramethylene ether and methylene-bis-(4-cyclohexyl isocyanate) was chain extended with butylene glycol to prepare a polyurethane elastomer, which was then dissolved to a concentration of 30 weight % in a solvent mixture containing dimethylformamide, isopropanol and ethyl acetate in a volume ratio of 15:50:35. To the 100 grams of the resulting solution was then added 50 grams of dimethylformamide.

Ten grams of the above-described powder colorant was added to the so obtained solution and stirred for 2 minutes with a spatula. The dispersion of the powder colorant in the solution was homogeneous. Further, when this colored resin solution was applied to a thickness of 3 mils to Cellophane and dried for 3 minutes at 130° C., a transparent, glossy film was obtained.

Control 3

Sixty grams of titanium dioxide, 200 grams of methyl ethyl ketone, 17.5 grams of the vinyl chloride copolymer used in Example 2, 20 grams of a 50% dimethylformamide solution of a methyl methacrylate-methyl acrylate copolymer (methyl methacrylate content 50%, average degree of polymerization 900, 40% DMF viscosity 40,000 cps.) and 7.5 grams of dibutyl phthalate were mixed, and then the mixture ws kneaded on a 70°–80° C. heated 3-roll mill to obtain a powder colorant.

When this powder colorant was added to a polyurethane elastomer solution as in Example 2, an innumerable amount of colored particles of particle size greater than 50 microns were noted.

EXAMPLE 3

Sixty grams of Copper Phthalocyanine Green, 15 grams of vinyl chloride copolymer (vinyl acetate content 13 %, maleic acid content 1%, average degree of polymerization 450, 40% DMF viscosity 14,000 cps.), 20 grams of an epoxy resin (epichlorohydrin-bisphenol A type, epoxy equivalent 170, 40% DMF viscosity 100 cps.), 5 grams of polyethylene glycol sorbitan monolaurate (dispersant), 0.5 gram of dibutyltin maleate (stabilizer) and 200 grams of methyl ethyl ketone were thoroughly stirred in a dispersing apparatus, after which the mixture was kneaded on a 70°–80° C. heated 2-roll mill followed by comminuting with a microcomminutor to obtain a powder colorant.

On the other hand, a polyester of average molecular weight about 2000 obtained from ethylene glycol and adipic acid and having hydroxyl groups at its both ends was reacted with toluene-2,4-diisocyanate to prepare a hydroxyl group excess polyurethane base, which was then dissolved to a concentration of 35% in a solvent mixture containing ethyl acetate and toluene in a volume ration of 2:1 to obtain a polyurethane base solution.

When 2 grams of the hereinbefore-described powder colorant was added to 20 grams of this solution and, while stirring with a spatula, 1.0 gram of 75% ethyl acetate solution of an isocyanate excess reaction product obtained from 1 mole of trimethylolpropane and 3 moles of toluence-2,4-diisocyanate was added followed by stirring the solution for a further 2 minutes, the powder colorant was homogeneously dispersed in the resin solution. Futher, when this colored solution was applied to a thickness of 3 mils to Cellophane and dried for 3 minutes at 130° C., a transparent, glossy film was obtained.

EXAMPLE 4

Example 3 was repeated but using instead of the epoxy resin used therein an epoxy resin of the epichlorohydrin- bisphenol A type whose epoxy equivalent was 1200 and 40% DMF viscosity was 3000 cps. to obtain a powder colorant. When this powder colorant was added to a polyurethane base solution identical to that of Example 3 and a film was prepared in like manner, a transparent, glossy film was obtained.

EXAMPLE 5

The experiment was operated as in Example 3 but using instead of the epoxy resin used therein an epoxy resin of the epichlorohydrin-bisphenol A type having an epoxy equivalent of 3000 and a 40% DMF viscosity of 7500 cps. to obtain a powder colorant.

This powder colorant was added to the same polyurethane base solution as that used in Example 3, and a film was prepared in like manner. Hardly any streaks were noted in the so obtained film.

Control 4

This experiment was carried out exactly as in Example 3, except that the epoxy resin used was of the epichlorohydrin-bisphenol A type having an epoxy equivalent of 4000 and a 40% DMF viscosity of 9800 cps. to obtain a powder colorant.

This powder colorant was added to a polyurethane base solution identical to that used in Example 3 followed by stirring for 2 minutes with a spatula and thereafter applied to Cellophane to a thickness of 3 mils and dried. In the resulting film there were noted an average of about 10 colored particles of 50 microns or larger per square centimeter of the film. In addition, a great number of streaks were noted. Hence, a transparent, glossy film was not obtainable.

EXAMPLE 6

Fifty grams of a chlorinated copper phthalocyanine pigment, along with 5 grams of polyethylene glycol sorbitan monolaurate and 200 grams of water, was kneaded on a 3-roll mill to prepare a water-containing paste. To the so obtained water-containing paste was added a solution of 20 grams of the vinyl chloride copolymer used in Example 2, 15 grams of a methyl methacrylate-vinyl acetate copolymer (vinyl acetate content 60%, average degree of polymerization 700, 40% DMF viscosity 900 cps.), 10 grams of dibutyl phthalate and 0.5 gram of dibutyltin meleate in amethyl ethyl ketone-toluol solvent mixture. After thoroughly agitating the resulting mixture in a mixer, it was vacuum dried and comminuted to obtain a powder colorant.

When 2 grams of this powder colorant was added to 20 grams of a vinyl chloride resin solution (average degree of polymerization 550, resin content 20%/methyl ethyl ketone), its solubility and dispersiveness were satisfactory. Further, when the so obtained colored resin solution was applied to Cellophane to a thickness of 3 mils and dried, a transparent, glossy film was obtained.

EXAMPLE 7

Eighty grams of red oxide, 5 grams of a vinyl chloride copolymer (vinyl acetate content 3% polyvinyl alcohol content 6%, average degree of polymerization 450, 40% DMF viscosity 16,000 cps.) and 15 grams of an epoxy resin [methylepichlorohydrin-(bisphenol A plus phthalic anhydride) type, epoxy equivalent 900, 40% DMF viscosity 1500 cps. ] were kneaded on a 70°–80° C. 2-roll mill along with 100 grams of methyl ethyl ketone, after which the kneaded mass was comminuted to obtain a powder colorant.

Two grams of this powder colorant was added to a combined solution of 20 grams of a castor oil-modified alkyd resin solution (40% castor oil, 36% phthalic ahydride, 24% glycerol, resin content 50%/xylol) and 5 grams of methyl ethyl ketone and stirred for 2 minutes with a spatula. The solubility and dispersiveness were satisfactory in this case. Further, the film obtained by coating Cellophane with this colored resin solution to a thickness of 3 mils was transparent and glossy.

EXAMPLE 8

Sixty grams of Phthalocyanine Green, 15 grams of the same vinyl chloride copolymer as that used in Example 1, 15 grams of an epoxy resin (methylepichlorohydrin-phthalic anhydride type, epoxy equivalent 170, 40% DMF viscosity 2300 cps.), 5 grams of dibutyl phthalate, 5 grams of polyethylene glycol sorbitan monolaurate, 0.5 gram of dibutyltin maleate and 200 grams of methyl ethyl ketone were thoroughly agitated in a dispersing apparatus, after which the mixture was kneaded on a 70°–80° C. 2-roll mill and thereafter comminuted with a microcomminutor to obtain a powder colorant.

When this powder colorant was added to the same resin solutions as those used in Examples 1–4, the solubility and dispersiveness in the resin solutions were satisfactory in all instances. Further, when these colored resin solutions were applied to Cellophane to a thickness of 3 mils and dried, the films obtained were transparent and glossy in all instances.

EXAMPLES 9–17

Powder colorants were obtained by operating the experiment as in Example 8 but using instead of the epoxy resin used therein the various resins shown in the following table.

Two grams of the powder colorants were severally added to 20 grams of the same hardenable urethane solution as that used in Example 3 and, after stirring for 2 minutes, were applied to Cellophane to a thickness of 3 mils followed by drying for 3 minutes at 130° C. The conditions of the so obtained films were examined, and the results are shown in the following table.

| Example | Resin Class | Resin Particulars | 40% DMF Viscosity | Condition of Film |
|---|---|---|---|---|
| 9 | modified saccharose | sucrose-benzoate (molecular weight 1110) | 200 cps. | transparent and glossy |
| 10 | '' | cyanoethyl sucrose (molecular weight 760) | 200 | '' |
| 11 | '' | sucrose-acetate isobutylate (molecular weight 860) | 200 | '' |
| 12 | sulfonamide resin | p-toluenesulfonamide-formaldehyde condensation product (molecular weight 560) | 200 | '' |
| 13 | '' | chlorobenzenesulfonamide-formaldehyde condensation product (molecular weight 650) | 350 | '' |
| 14 | epoxy resin | methylepichlorohydrin-bisphenol A type (epoxy equivalent 900) | 1100 | '' |
| 15 | '' | methylepichlorohydrin-(bisphenol A + phthalic anhydride) type (epoxy equivalent 500) | 80 | '' |

-continued

| Example | Resin Class | Resin Particulars | 40% DMF Viscosity | Condition of Film |
|---|---|---|---|---|
| 16 | " | methylepichlorohydrin-phthalic anhydride type (epoxy equivalent 210) | 7500 | hardly any streaks |
| 17 | novolak type phthalic resin | phenol-formalin type (molecular weight 800) | 400 | transparent and glossy |

What is claimed is

1. A coloring composition of powder form excelling in dispersiveness in solutions of resinous coating materials, comprising (a) a pigment, (b) a vinyl chloride copolymer of an average degree of polymerization of 350–800 and in which the other monomer copolymerized with vinyl chloride is contained in a proportion of 5–30 weight parts per 100 weight parts of vinyl chloride, and (c) a ketonic resin having a molecular weight of from 500–1000 and whose viscosity in a 40 weight % dimethyl-formamide solution is 80–7500 centipoises, said (b) and (c) being present on a weight basis in proportions of 1:0.5–5 said (a) being present in proportions of 20–80% by weight of the sum total of (a), (b) and (c).

2. The coloring composition of claim 1 wherein said ketonic resin is the reaction product of a ketone selected from the group consisting of acetone, methyl ethyl ketone, and cyclohexanone with an aldehyde selected from the group consisting of formaldehyde, formalin, paraformaldehyde, hexamethylenetetramine, para-aldehyde and acetaldehyde.

3. The coloring composition of claim 2 which further includes (d) a plasticizer for vinyl chloride.

4. The coloring composition of claim 1 wherein said other monomer is selected from the group consisting of vinyl acetate, vinyl stearate, ethylene, propylene, ethyl vinyl ether, acrylic acid esters, methacrylic acid esters, vinyl alcohol, maleic anhydride, maleic acid, itaconic acid, acrylonitrile and vinylidene chloride.

* * * * *